United States Patent
Ahsan et al.

(10) Patent No.: US 12,177,531 B2
(45) Date of Patent: Dec. 24, 2024

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Saba Ahsan, Espoo (FI); Igor Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/779,656

(22) PCT Filed: Nov. 17, 2020

(86) PCT No.: PCT/FI2020/050768
§ 371 (c)(1),
(2) Date: May 25, 2022

(87) PCT Pub. No.: WO2021/105552
PCT Pub. Date: Jun. 3, 2021

(65) Prior Publication Data
US 2023/0012201 A1    Jan. 12, 2023

(30) Foreign Application Priority Data
Nov. 29, 2019 (FI) ...................................... 20196033

(51) Int. Cl.
*H04N 21/6587* (2011.01)
*H04N 19/597* (2014.01)
*H04N 21/218* (2011.01)

(52) U.S. Cl.
CPC ....... *H04N 21/6587* (2013.01); *H04N 19/597* (2014.11); *H04N 21/21805* (2013.01)

(58) Field of Classification Search
CPC ............. H04N 21/6587; H04N 19/597; H04N 21/21805
See application file for complete search history.

(56) References Cited

U.S. PATENT DOCUMENTS 10,783,668 B2 *  9/2020  Sinharoy ................... G06T 7/55
11,323,683 B2 *  5/2022  Kammachi Sreedhar ...................
                                                H04N 13/172
2020/0250891 A1 *  8/2020  Curcio ............. H04N 21/85406

FOREIGN PATENT DOCUMENTS

EP       3 422 711 A1    1/2019
WO    WO 2019/093734 A1   5/2019
(Continued)

OTHER PUBLICATIONS

3GPP TSG-SA4 Meeting #106, Busan, Korea, Oct. 21-25, 2019, S4-191256, "ITT4RT Permanent Document—Requirements, Working Assumptions and Potential Solutions", Intel, Futurewei Technologies, Inc. (ITT4RT CoRapporteurs), 25 pgs.

(Continued)

*Primary Examiner* — Mishawn N. Hunter
(74) *Attorney, Agent, or Firm* — Harrington & Smith

(57) ABSTRACT

The embodiments relate to a method including generating a bitstream defining a presentation including an omnidirectional visual media content; encoding into the bitstream a parameter to indicate viewport-control options for viewing the presentation, wherein the viewport-control options includes options controllable by a receiving device and options not-controllable by the receiving device and sending the bitstream to the receiver device; receiving one of the indicated viewport-control options from the receiver device as a response; streaming the presentation to the receiver device; when the response has included an indication on a viewport-control controllable by the receiving device, the method also includes receiving information on viewport definitions from the receiver device during streaming of the presentation and adapting the presentation accordingly; when the response has included an indication on a viewport-control not-controllable by the receiving device, the presen- (Continued)

tation is streamed to the receiver device according to the viewport-control specified in the response.

18 Claims, 10 Drawing Sheets

(56) References Cited

FOREIGN PATENT DOCUMENTS

| WO | WO 2019/118617 A1 | 6/2019 |
|---|---|---|
| WO | WO 2019/141901 A1 | 7/2019 |

OTHER PUBLICATIONS

Schulzrinne, H. et al. "RTP: A Transport Protocol for Real-Time Applications" RFC 3550 Jul. 2003.

\* cited by examiner

METHOD, AN APPARATUS AND A COMPUTER PROGRAM PRODUCT FOR VIDEO ENCODING AND VIDEO DECODING

CROSS REFERENCE TO RELATED APPLICATION

This patent application is a U.S. National Stage application of International Patent Application Number PCT/FI2020/050768 filed Nov. 17, 2020, which is hereby incorporated by reference in its entirety, and claims priority to FI 20196033 filed Nov. 29, 2019.

TECHNICAL FIELD

The present solution generally relates to video encoding and/or transmission and video decoding and/or reception.

BACKGROUND

Devices that are able to capture image and video have evolved from devices capturing a limited angular field of view to devices capturing 360-degree Content. These devices are able to capture visual and audio content all around them, i.e. they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising generating a bitstream defining a presentation, the presentation comprising an omnidirectional visual media content; encoding into a bitstream a parameter to indicate viewport-control options for viewing the presentation, wherein the viewport-control options comprises options controllable by a receiving device and options not-controllable by the receiving device and sending the bitstream to the receiver device; receiving one of the indicated viewport-control options from the receiver device as a response; streaming the presentation to the receiver device; when the response has comprised an indication on a viewport-control controllable by the receiving device, the method also comprises receiving information on viewport definitions from the receiver device during streaming of the presentation and adapting the presentation accordingly; when the response has comprised an indication on a viewport-control not-controllable by the receiving device, the presentation is streamed to the receiver device according to the viewport-control specified in the response.

According to a second aspect, there is provided an apparatus comprising means for generating a bitstream defining a presentation, the presentation comprising an omnidirectional visual media content; means for encoding into a bitstream a parameter to indicate viewport-control options for viewing the presentation, wherein the viewport-control options comprises options controllable by a receiving device and options not-controllable by the receiving device, and means for sending the bitstream to the receiver device; means for receiving one of the indicated viewport-control options from the receiver device as a response; means for streaming the presentation to the receiver device; when the response has comprised an indication on a viewport-control controllable by the receiver device, the apparatus also comprises means for receiving information on viewport definitions from the receiver device during streaming of the presentation and means for adapting the presentation accordingly; when the response has comprised an indication on a viewport-control not-controllable by the receiving device, the apparatus comprises means for streaming the presentation to the receiver device according to the viewport-control specified in the response.

According to a third aspect, there is provided an apparatus comprising at least one processor, memory including computer program code, the memory and the computer program code configured to, with the at least one processor, cause the apparatus to perform at least the following:

generate a bitstream defining a presentation, the presentation comprising an omnidirectional visual media content;

encode into a bitstream a parameter to indicate viewport-control options for viewing the presentation, wherein the viewport-control options comprises options controllable by a receiving device and options not-controllable by the receiving device and to send the bitstream to the receiver device;

receive one of the indicated viewport-control options from the receiver device as a response;

stream the presentation to the receiver device;

when the response has comprised an indication on a viewport-control controllable by the receiving device, the computer program product comprises computer program code to cause the apparatus or the system to receive information on viewport definitions from the receiver device during streaming of the presentation and adapt the presentation accordingly;

when the response has comprised an indication on a viewport-control not-controllable by the receiving device, the computer program product comprises computer program code to cause the apparatus or the system to stream the presentation to the receiver device according to the viewport-control specified in the response.

According to a fourth aspect, there is provided computer program product comprising computer program code configured to, when executed on at least one processor, cause an apparatus or a system to generate a bitstream defining a presentation, the presentation comprising an omnidirectional visual media content; to encode into a bitstream a parameter to indicate viewport-control options for viewing the presentation, wherein the viewport-control options comprises options controllable by a receiving device and options not-controllable by the receiving device and to send the bitstream to the receiver device; to receive one of the indicated viewport-control options from the receiver device as a response; to stream the presentation to the receiver device; when the response has comprised an indication on a viewport-control controllable by the receiving device, the computer program product comprises computer program code to cause the apparatus or the system to receive information on viewport definitions from the receiver device during streaming of the presentation and adapt the presentation accordingly; when the response has comprised an indication on a viewport-control not-controllable by the receiving device, the computer program product comprises computer program code to cause the apparatus or the system to stream the presentation to the receiver device according to the viewport-control specified in the response.

According to an embodiment, the viewport-control options controllable by the receiving device comprises controlling the viewport by the receiving device up to three degrees of freedom, or up to six degrees of freedom in a constrained space or in an unconstrained space.

According to an embodiment, the viewport-control options not-controllable by the receiving device comprises viewport-control based on recommended viewport, or a presenter viewport.

According to an embodiment, the omnidirectional visual media content is received over a network.

According to an embodiment, the omnidirectional visual media is captured.

According to an embodiment, audio is received from the receiving device.

DESCRIPTION OF THE DRAWINGS

In the following, various embodiments will be described in more detail with reference to the appended drawings, in which.

DESCRIPTION OF EXAMPLE EMBODIMENTS

Figure 1:
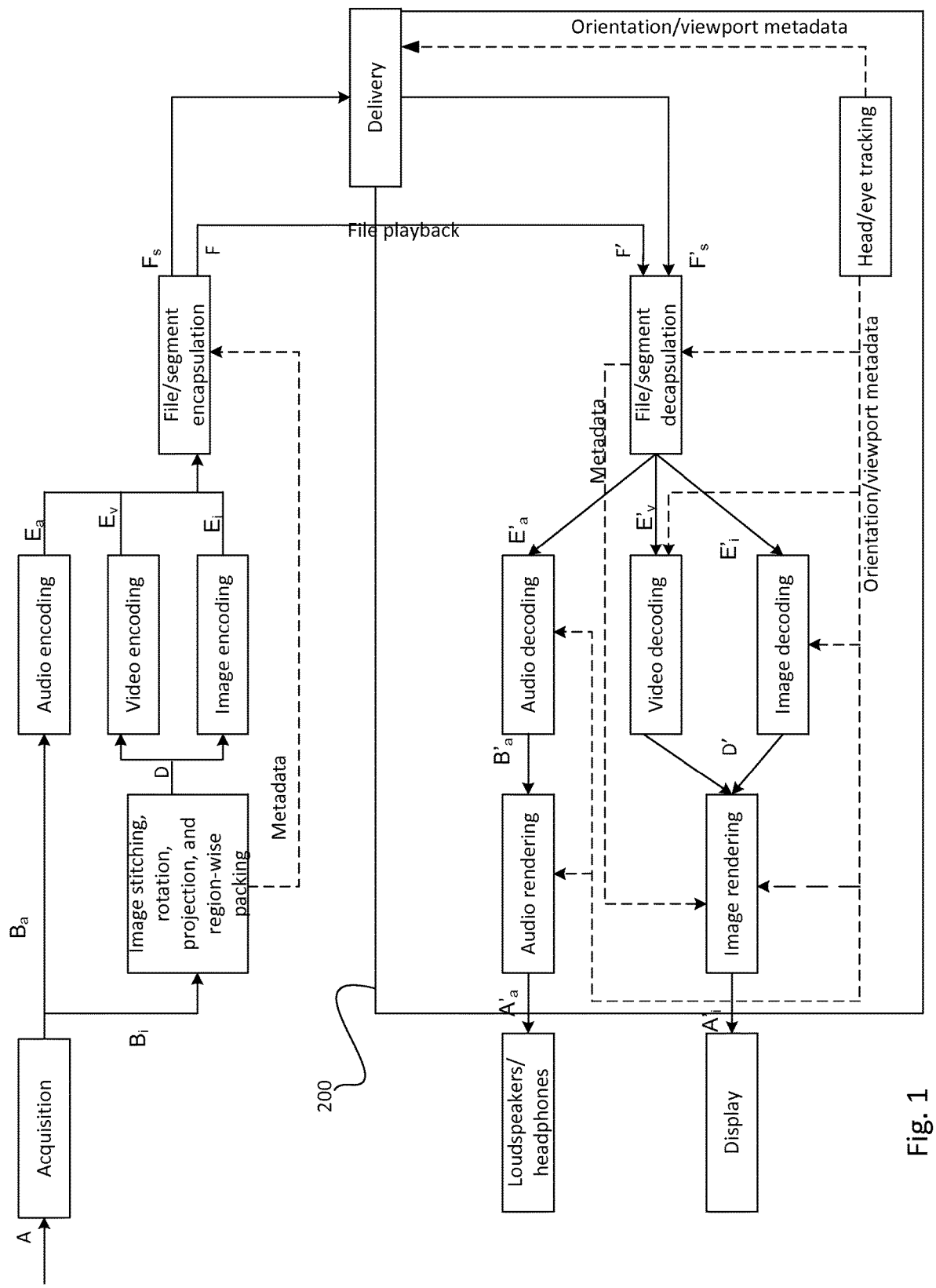
FIG. 1 shows an example of an OMAF end-to-end system.

In the following, several embodiments will be described in the context of virtual reality (VR). VR content consumption is immersive. There are many scenarios which require the VR user to view or interact with content or information which is not germinating from the VR content. The present embodiments enable immersive content consumption on a device, when the content is being sent over the network. The present embodiments are applicable in 360-degree VR Conferencing. It is to be noted, however, that the invention is not limited to VR Conferencing. In fact, the different embodiments have applications in any environment where VR video streaming is performed.

Since the beginning of photography and cinematography, the most common type of image and video content has been captured by cameras with relatively narrow field of view and displayed as a rectangular scene on flat displays. Such content is referred as "flat content", or "flat image", or "flat video" in this application. The cameras are mainly directional, whereby they capture only a limited angular field of view (the field of view towards which they are directed). Such a flat video is output by a display device capable of displaying two-dimensional content.

More recently, new image and video capture devices have become available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output such as head-mounted displays, and other devices, allow a person to see the 360-degree visual content.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

High Efficiency Image File Format (HEIF) is a standard developed by the Moving Picture Experts Group (MPEG) for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the following, term "omnidirectional" may refer to media content that may have greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree Field-of-view horizontally and a 180-degree Field-of-view vertically can be represented by a sphere that has been mapped to a two-dimensional image plane using the equirectangular projection (ERP). In this case, the horizontal coordinate may be considered equivalent to a longitude, and the vertical coordinate may be considered equivalent to a latitude, with no transformation or scaling applied. In some cases, panoramic content with a 360-degree horizontal field-of-view, but with less than a 180-degree vertical field-of-view may be considered special cases of equirectangular projection, where the polar areas of the sphere have not been mapped onto the two-dimensional image plane. In some cases, panoramic content may have less than a 360-degree horizontal field-of-view and up to a 180-degree vertical field-of-view, while otherwise having the characteristics of an equirectangular projection format.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF (3 Degrees of Freedom) content (where the viewer is located at the centre of a unit sphere and has three degrees of freedom (Yaw-Pitch-Roll). The following phase standardization (MPEG-I Phase 1b) is close to completion. This phase is expected to enable multiple 3DoF and 3DoF+ content consumption with user interaction and means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree Content on a conventional display, the spatial part that is currently displayed is a viewport. A viewport is a window on the 360-degree world represented in the omnidirectional video displayed via a rendering display. A viewport may be characterized by a horizontal field-of-view (VHFOV) and a vertical field-of-view (VVFoV).

The 360-degree space may be divided into a discrete set of viewports, each separated by a given distance (e.g., expressed in degrees), so that the omnidirectional space can be imagined as a map of overlapping viewports, and the viewport is switched discretely as the user changes his/her orientation while watching content with a head-mounted display (HMD). When the overlapping between viewports is reduced to zero, the viewports can be imagined as adjacent non-overlapping tiles within the 360-degrees space. The H.265 video codec implements the concept of tiles which may be used to realize this scenario (both overlapping and not).

When streaming VR video, a subset of 360-degree video content covering the viewport (i.e., the current view orientation) may be transmitted at the best quality/resolution, while the remaining of 360-degree video may be transmitted at a lower quality/resolution. This is what characterizes a VDS systems, as opposed to a Viewport Independent Streaming system, where the omnidirectional video is streamed at high quality in all directions.

The Omnidirectional Media Format (OMAF) standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following: A recommended viewport per the director's cut, e.g., a viewport suggested according to the creative intent of the content author or content provider.

FIG. 1 illustrates the OMAF system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over network.

The omnidirectional media comprises image data (Bi) and audio data (Ba), which are processed separately. In image stitching, rotation, projection and region-wise packing, the images/video of the source media and provided as input (Bi) are stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent picture on one projected picture. Rectangular region-wise packing can then be applied to obtain a packed picture from the projected picture. The packed pictures (D) are then provided for video and image encoding to result in encoded image ($E_i$) and/or encoded video stream ($E_v$). The audio of the source media is provided as input (Ba) to audio encoding that provides as an encoded audio ($E_a$). The encoded data ($E_i$, $E_v$, $E_a$) are then encapsulated into file for playback (F) and delivery (i.e. streaming) ($F_s$).

In the OMAF player 200, such as in a HMD, a file decapsulator processes the files (F', F's) and extracts the coded bitstreams ($E'_i$, $E'_v$, $E'_a$) and parses the metadata. The audio, video and/or images are then decoded into decoded data (D', $B'_a$). The decoded pictures (D') are projected onto a display according to the viewport and orientation sensed by a head/eye tracking device. Similarly, the decoded audio ($B'_a$) is rendered through loudspeakers/headphones.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), wherein each may contain a few seconds of multimedia data. A Cluster comprises BlockGroup elements, which in turn comprise Block Elements. A Cues Element comprises metadata which may assist in random access or seeking and may include file pointers or respective timestamps for seek points.

A transmission channel or a communication channel or a channel may refer to either a physical transmission medium, such as a wire, or to a logical connection over a multiplexed medium.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver device may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Figure 2A:
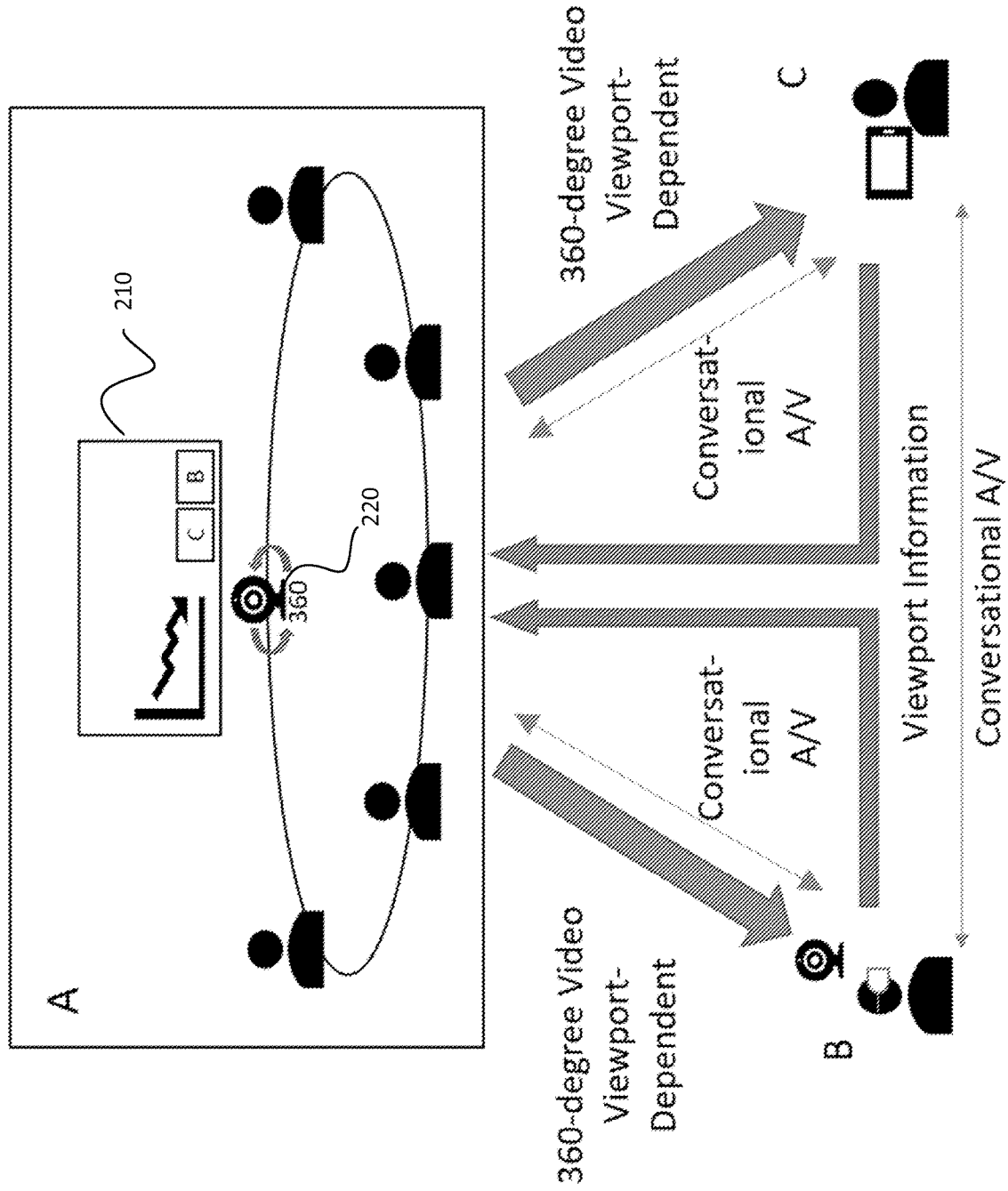
FIGS. 2a-2c show examples on a conference room with participants.
Figure 2B:
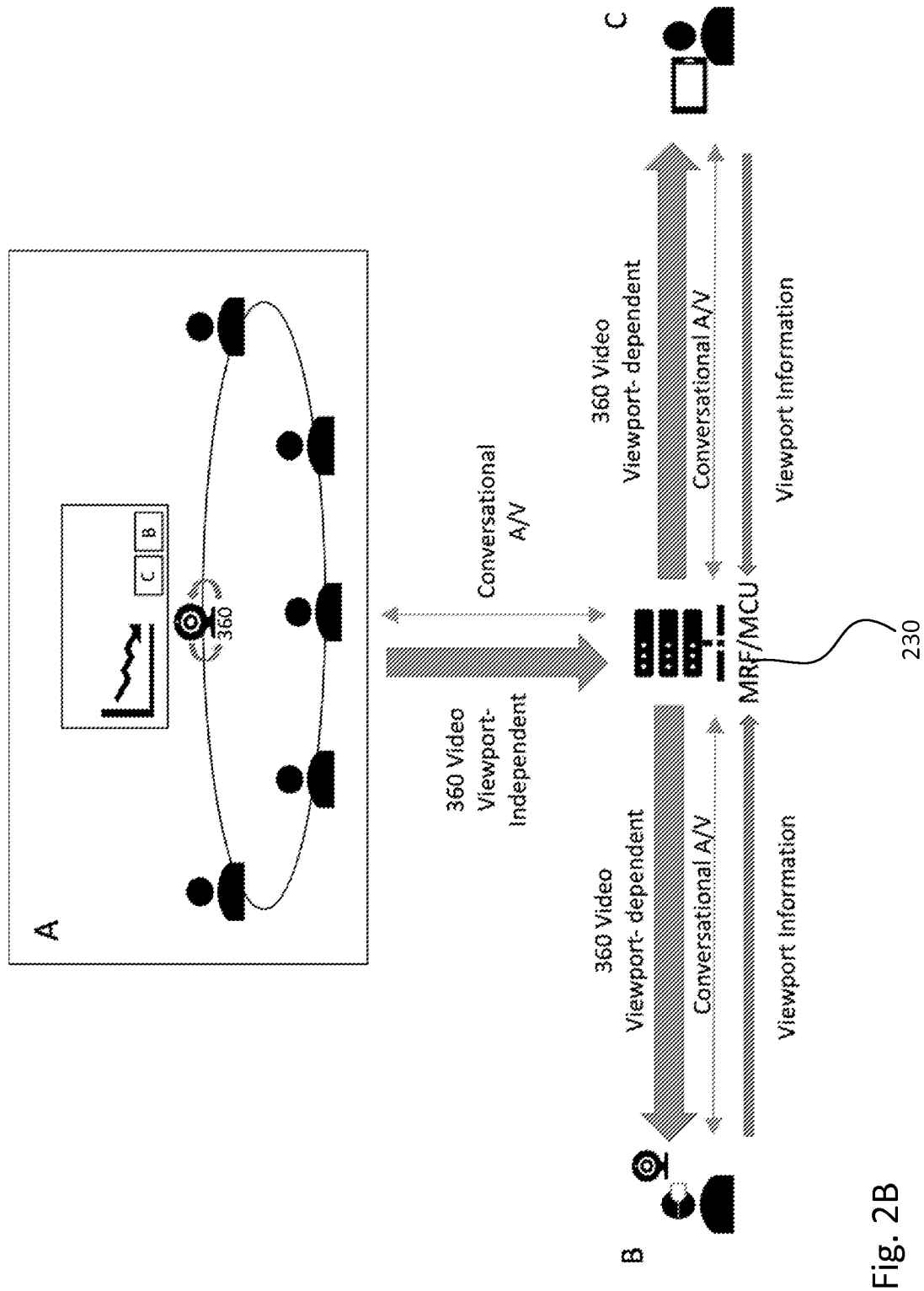
Figure 2C:
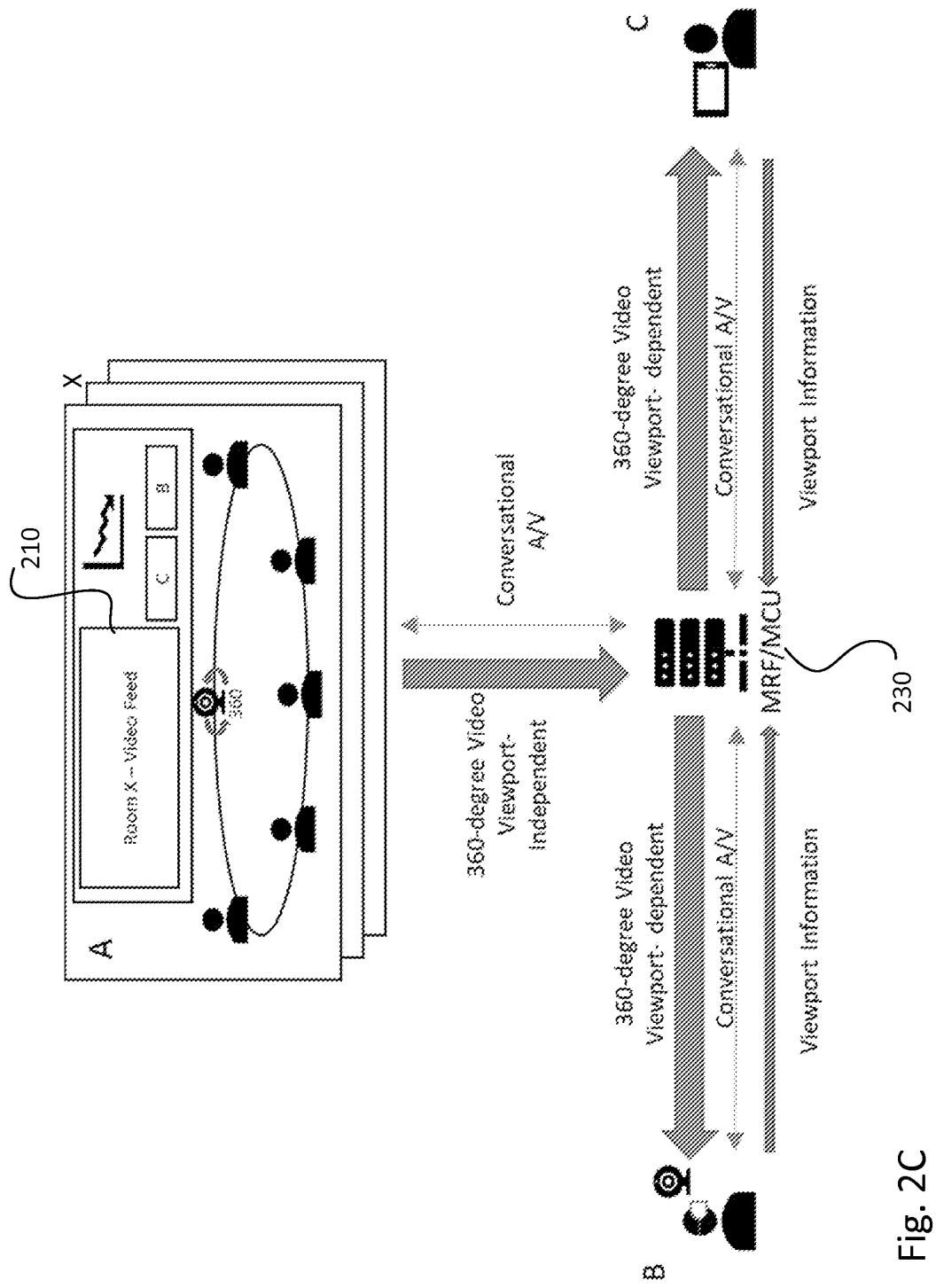

In the following, embodiments for streamable 360-degree event, such as a 360-degree Conference, teleconference, telepresence, are discussed. However as was mentioned, in addition to the 360-degree Conference, the embodiments are suitable for other VR streaming solutions, as well. FIGS. 2a-2c represent various scenarios for a 360-degree teleconference. A 360-degree Conference can be a live meeting which is streamed to receiver device(s) by the sender, wherein the sender is a video source, such as a 360-degree (i.e. omnidirectional) camera, or a system being operatively connected to a video source or comprising means to record video. The streamable content from the sender to the receiver comprises at least video and audio. The purpose of the sender is to stream video being recorded forward to receiver device(s). The sender may also comprise means for receiving at least audio data from receiver device(s), and output the received audio data to the participants of the streamable event.

In FIGS. 2a-2c a group of participants is having a meeting in a conference room. The conference room can be considered as a virtual conference system A with physical elements (i.e. camera 220, view screen 210, physical participants) being able to share content to and to receive data from remote participants. As mentioned, the virtual conference system A comprises at least a 360-degree (i.e. omnidirectional) camera 220 and a view screen 210. The meeting is also participated by two remote participants B, C through a conference call. Physical participants of the virtual conference system A use the view screen 210 to display a shared presentation and/or video streams coming from the remote participants B, C. One of the remote participants B is using a head mounted display for having a 360-degree view to conference content and a camera that captures his/her video. One of the remote participants C uses a mobile phone to access the conference. The mobile phone is able to show a 360-degree video on the conference and to capture his/her video.

In the example of FIG. 2a, the conference call is set up without any media-aware network elements. Both remote participants B, C send information about their viewport orientation to the virtual conference system A, which in turn sends them a viewport-dependent video stream from the 360-degree Camera 220.

In the example of FIG. 2b, the conference call is set up using a network function, which may be performed by either a Media Resource Function (MRF) or a Media Control Unit (MCU) 230. In this example, the MRF/MCU 230 receives a viewport-independent stream from the virtual conference system A. Both remote participants B, C send viewport orientation information to the MRF/MCU 230 and receive viewport-dependents streams from it. The A/V channel for conversational non-immersive content may also go through the MRF/MCU 230, as shown in FIG. 2b. The example of FIG. 2b aims to enable immersive experience for remote participants B, C joining the teleconference with two-way audio and one-way immersive video.

In the example of FIG. 2c, a virtual conference system for multiple conference rooms X are sending 360-degree video to an MRF/MCU 230. The rooms may choose to receive 2D video streams from other participants including one of the other rooms, which is displayed on the view screen 210 in the room. The remote participants B, C can choose to view any one or none of the available 360-degree videos from the multiple rooms. Switching from one room to another may be triggered manually, or using other mechanisms, such as viewing direction or dominant speaker. The MRF/MCU 230 may signal to pause the receiving 360-degree video from any of the rooms that do not currently have any active viewers.

In some embodiments, the 360-degree Conference can be completely virtual, where all the meeting participants are remote participants, i.e. receiver devices connecting to the conference via a network, and where the sender is a computer generating a virtual representation of the virtual conference and the remote participants.

Figure 3:
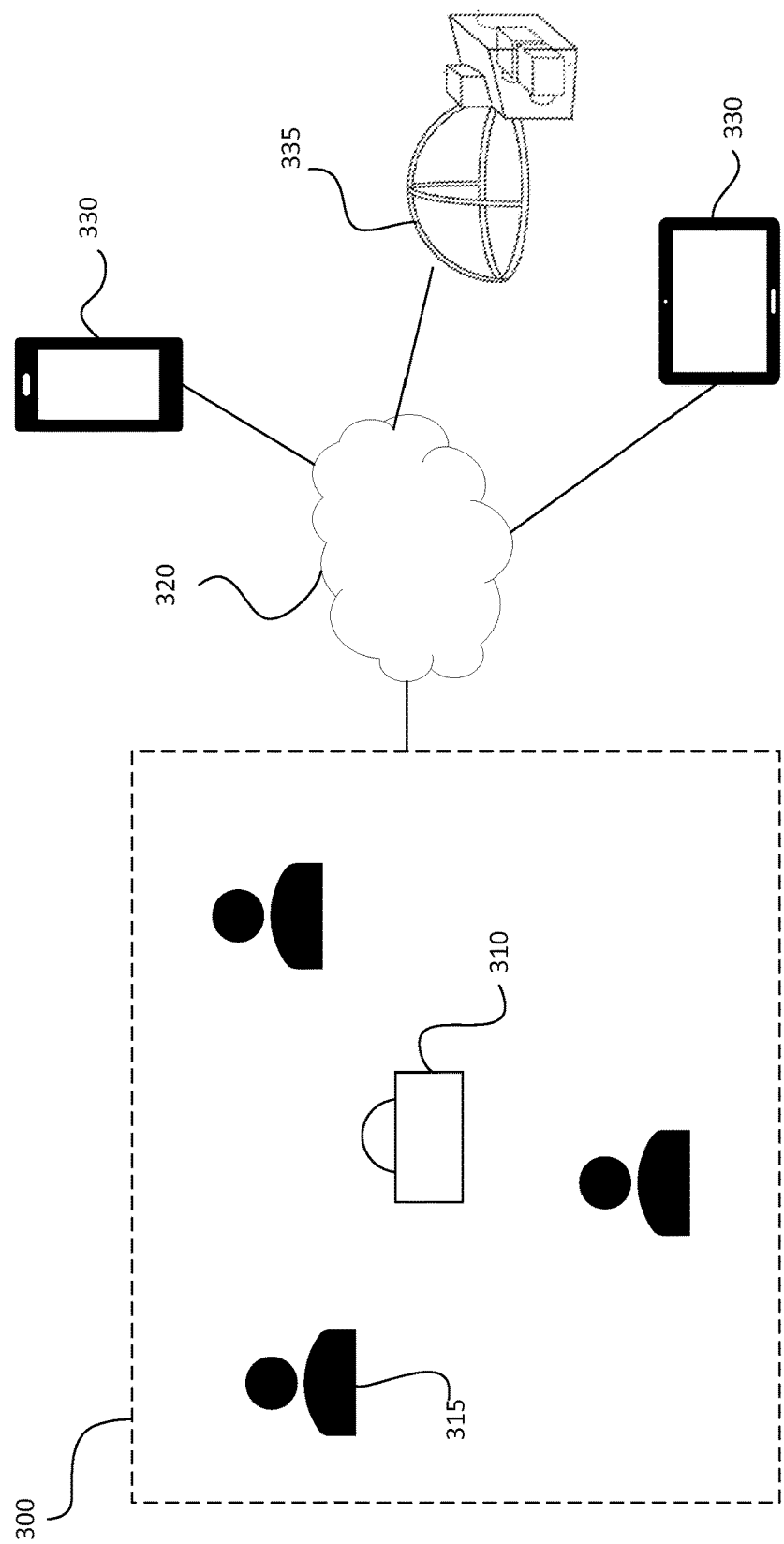
FIG. 3 shows an example of a teleconference setup.

FIG. 3 illustrates a further example of a set-up for 360-degree Conference 300. In this example, a 360-degree Conference 300 comprises at least one sender, such as a 360-degree video system 310 recording the conference. In addition, the 360-degree Conference 300 comprises not only the live participants 315, but also one or more remote participants with receiver devices 330, 335 "participating" the conference by establishing a connection to the conference system which makes it possible to watch the 360-degree video captured by the 360-degree video system 310. In the following, the devices 330, 335 of the remote participants are referred to as "receiver devices" to emphasize their role as a receiving party for the streamed content. It is however appreciated that the receiver devices 330, 335 are also able to send data, for example audio.

The receiver devices 330, 335 can be virtual reality display systems, such as head mounted displays 335, but alternatively also (or in addition) displays 330 capable of showing only two-dimensional (2D) content.

Head mounted display is a device capable of showing three-dimensional (3D) content. For that purpose, a head mounted display may comprise two screen sections or two screens for displaying images for left and right eyes. The displays are close to the eyes, and therefore lenses are used to make the images easily viewable and for spreading the images to cover as much as possible of the eyes' field of view. The HMD is attached to the head of the user so that it stays in place even when the user turns his head. The device may have an orientation detecting module for determining the head movements and direction of the head. The head mounted display gives a three-dimensional (3D) perception of the recorded/streamed content to a user. The user of the head mounted display sees, at a given time instant, only a portion of 360-degree Content, referred to as viewport, the size of which is being defined by the vertical and horizontal field-of-views of the HMD. Most of the audio objects of the immersive content may be visible in the viewport, while some audio objects may reside behind the user, therefore being non-visible in the viewport. As mentioned, viewport is a portion of 360-degree Content. Therefore, "viewport" is a term for defining a region of omnidirectional image or video suitable for display and viewing by the user, and is defined as the part of the spherical video that is currently displayed and hence is viewable by the user(s).

In FIG. 3, the sender is illustrated as a 360-degree video system 310. It is appreciated, that instead of the 360-degree video system 310, the sender may be one of the conference participants sharing a 360-degree video, or the sender may be a middlebox or a network appliance, i.e. any computer networking device capable of media distribution. Examples of such middlebox are media gateway, conference server etc. The sender may be also a streaming server configured to deliver the content via the MPEG DASH protocol. Depending on the capabilities of the sender, it may offer viewport-independent or viewport-dependent delivery. Furthermore, if viewport-dependent delivery is offered, the control signals for determining the viewport need to be delivered from the head mounted display, or other device able to display 360-degree Content, to the sender.

The viewport can be determined based on head and body movements of the user of the receiver device, such as the HMD 335. The viewport may be sent from the receiver device 335 via control channel to the sender, such as the 360-degree video system 310. Based on the received viewport, the sender is able to send video content relating to the determined viewport. It is appreciated that viewport control from means other than own movements of HMD users can cause motion sickness for the viewers.

For determining the viewport, a VR conferencing system (comprising both sender and receiver) may support 3DoF. A system supporting 3DoF allows rotational head motion around yaw, pitch and roll. In another embodiment, 6DoF (6 Degrees of Freedom) motion may be supported. 6DoF allows further translational head or body movements, in addition to the rotational movements, e.g., translationally moving head or body up, down, right, left, forwards and backwards, including walking around a space in any direction. 6DoF motion may be constrained to a defined space within which the user can move around (e.g., 3DoF+) or unconstrained.

Figure 4:
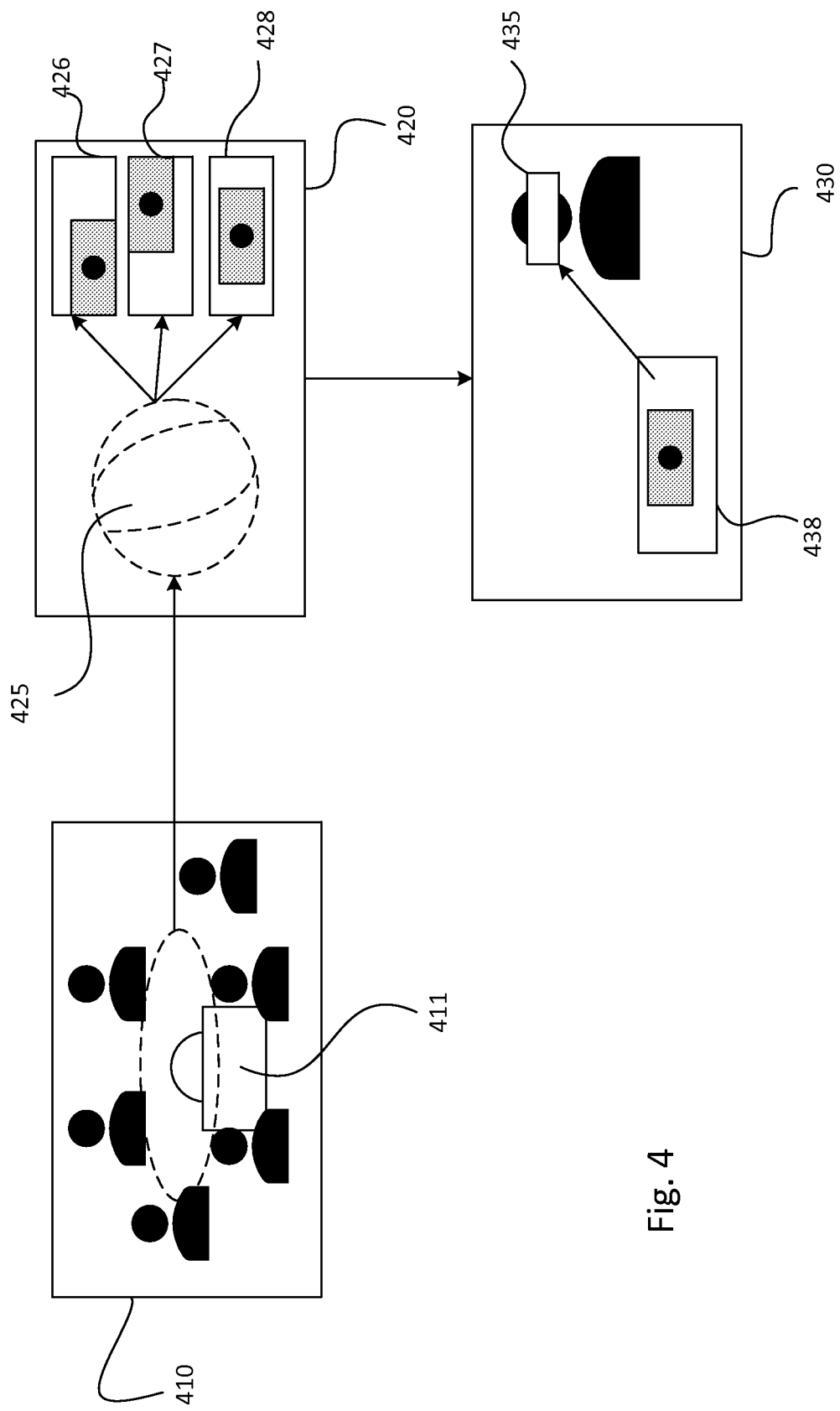
FIG. 4 shows an example of a various phases for a teleconference.

FIG. 4 illustrates an example of the delivery of a video conference stream. At a capturing phase 410, a video camera 411 records omnidirectional data on the conference including several participants. At phase 420, the video camera system or a middlebox or some other network server generates viewport-dependent content 426, 427, 428 (the number of viewports may vary greatly from what has been shown in FIG. 4) on the captured omnidirectional data 425. At consumption phase 430, certain content 438 is provided to a head mounted display 435 of a user. The provided content 438 may be determined, for example, according to the head movements and direction of the head, or from the manual selection of the user. Such an information may have been provided to the video camera system or the middlebox generating the viewport-dependent content.

Alternatively, if the receiver device is a 2D display (shown in FIG. 3 with reference number 330), the user of the display may choose to follow the viewport of another user or to choose the viewport that is based on other predictive methods available at the sender, such as, dominant speaker or motion tracking.

With respect to the above discussion on the viewport, the aim of the present embodiments is to provide appropriate session-level signaling to signal the types of viewport-control signaling that is supported by the sender, i.e. a video source, and the type of viewport-control that the receiver device, i.e. the remote device, wants to use during the session.

When the receiver device has joined the 360-degree video conference to receive the 360-degree video content on the conference, the 360-degree sender may send video content to the receiver devices in any of the following formats:
  Immersive viewport-independent video;
  Immersive viewport-dependent video;
  Flattened viewport-dependent 2D content.

The immersive viewport-independent video refers to a content, which does not have any viewport definitions therein. The delivery of the immersive viewport-independent video may be chosen by the sender if the sender is not capable of providing viewport-dependent content. Alternatively, a middlebox (e.g. a media gateway) that distributes the video to multiple receiver devices may request viewport-independent video from the video sender and redistribute viewport-dependent video to the receiver devices. This kind of a situation may occur, when the sender is not able to provide/encode viewport-dependent streams for a large number of receivers, whereupon the middlebox is configured to assist the conference call for that respect. As a further alternative, a receiver device can request viewport-independent video because of device capability limitations, privacy reasons or personal preference.

The immersive viewport-dependent video refers to a content, where the images that lie within the viewport are treated differently than the rest of the sphere (e.g. by encoding the viewport at a higher quality) Such a content can be provided by the sender to a receiver device based on the viewport orientation. The viewport can be determined by the sender based on viewport information it receives from the receiver device via signaling. In another case, it may determine the viewport of a user A based on the viewport information it receives from user B via signaling, when A has chosen to follow B's viewport, and this has already been negotiated and agreed between all parties during session control. In a third case, sender may determine the viewport for a receiver device based on a predictive or other application-level method (e.g. dominant speaker, motion tracking etc.) with no external signaling.

Flattened viewport-dependent 2D content refers to a content that is non-immersive. Such a content can be provided to a receiver device with a 2D display based on a viewport. The videos source can determine the viewport based on viewport information being received from the receiver device via signaling. In another case, the sender may determine the viewport of a user A based on the viewport information it receives from user B via signaling, when A has chosen to follow B's viewport, and this has already been negotiated and agreed between all parties during session control. In a third case, sender may determine the viewport for a receiver device based on a predictive or other application-level method (e.g. dominant speaker, motion tracking, etc.) with no external signaling. Flattened viewport-dependent 2D content may also be requested by a HMD receiver device that wants to display the requested content as a 2D overlay on top of other VR content.

The receiver device for the 360-degree video content is able to choose the viewport control option it would like to use during streaming the video e.g. during a conference call. This is applicable even if the receiver device wants to receive a flattened 2D version of the immersive content. The viewport control option can be one of the following:

The receiver device controls the viewport and this information is signaled back to the sender during the session, e.g. using RTCP feedback. The sender may offer different signaling mechanisms, if more than one is possible.

The receiver device controls the viewport, but this information is not signaled back to the sender during the session. This implies that the media will not be delivered as viewport-dependent content.

The receiver device will follow the viewport of another user (presenter). If this option is used, the sender may provide a list of possible presenters to the user of the receiver device to choose from. Additional signaling may be needed to request permission from the presenter.

The sender can encode to a bitstream a parameter to indicate the type of the viewport-control options it may offer for viewing the 360-degree video. The bitstream may be signaled from the sender to a receiving device during session control or session established. The parameter specifying options for controlling the viewport is—according to an embodiment-viewport_ctrl (it is appreciated that the name of the parameter may vary). viewport_ctrl may have one or more of the following values:

device_signalled_3dof;
device_signalled_6dofc;
device_signalled_6dofu;
device_notsignalled;
recommended_viewport;
O presenter_viewport.

The receiver device may select one of the values to be included to a response that is sent from the receiver device to the sender.

When the response comprises device_signalled_3dof, the viewport will be controlled by the receiver device up to 3DoF. The receiver device will signal this information (e.g., yaw, pitch, roll or other viewport coordinates in a different format) to the sender during the session. The type of signaling that will be used for viewport-feedback can be negotiated using a different parameter or it can be done within the viewport_ctrl signal e.g. using device_signalled_rtcpfb etc.

When the response comprises device_signalled_6dofc, the viewport will be controlled by the receiver device up to 6DOF in a constrained space (e.g., 3DoF+ or Windowed 6DoF as defined by the MPEG committee), and the receiver device will signal this information to the sender during the session. The type of signaling that will be used for viewport feedback can be negotiated using a different parameter or it can be done within the viewport_ctrl signal e.g. using device_signalled_rtcpfb etc.

When the response comprises device_signalled_6dofu, the viewport will be controlled by the receiver device up to 6DoF unconstrained space, and the receiver device will signal this information to the sender during the session. The type of signaling that will be used for viewport feedback can be negotiated using a different parameter or it can be done within the viewport_ctrl signal e.g. using device_signalled_rtcpfb etc.

When the response comprises device_notsignalled, the viewport will be controlled by the receiver device and the receiver device will not signal any information to the sender during the session (e.g., for privacy reasons). This mode will result in receiving viewport-independent streams.

When the response comprises recommended_viewport, the receiver device will follow the recommended viewport of the media stream, which will be determined by the sender. There may be more than one mechanism offered for recommended viewport, which may be signaled separately or as an extension of viewport_ctrl. For example, recommended_viewport_audio, recommended_viewport_motion, etc.

When the response comprises presenter_viewport, the receiver device will follow the viewport of the presenter, where the presenter is another viewer of the same stream. When using this mode, the receiver device should be able to select the presenter if there are more than one using an appropriate signaling (e.g., by indicating the name of the presenter, or an index, or alike).

The information defined above may flow from the receiver to the sender. However, alternatively, the information may be transmitted from the sender towards the receiver(s). In this case, there may be no negotiation, but just acceptance or rejection from the receiver side.

The signaling can be performed via the IETF SDP (Session Description Protocol), which is a format for describing streaming media communications parameters. The SDP may be used in conjunction with RTP, RTSP, or SIP. The syntax and semantics of the SDP fields are given below, as an example. The signal viewport_ctrl may be included as an attribute of the media-type or as a session-level parameter that applies to all media types where viewport-control is required.

Syntax
v=0
o=Alice 2890844526 2890842807 IN IP4 131.163.72.4
s=360 VR conferencing
C=IN IP4 131.164.74.2
t=00
m=video 49170 RTP/AVP 99
a=rtpmap:99 H264/90000
a=viewport_ctrl:<control_type>

Figure 5:
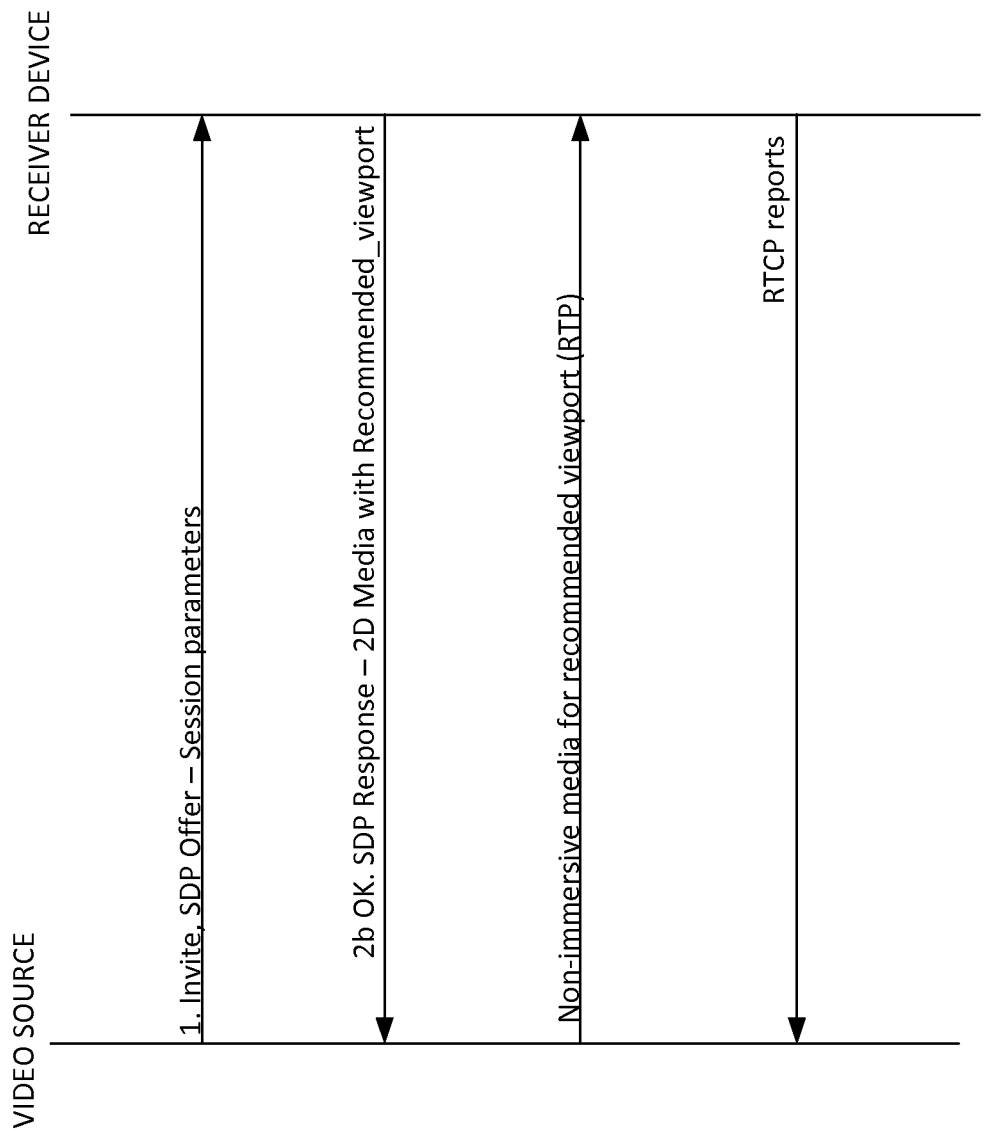
FIG. 5 shows an example of a signaling flow where 2D video formed as a sequence of 360-degree video recommended viewports is being requested by a receiver device.

Semantics
   control_type:
      0→device_notsignalled
      1→device_signalled_3dof
      2→device_signalled_6dofc
      3→device_signalled_6dofu
      4→recommended_viewport
      5→presenter_viewport The sender comprises a list of all viewport control options it supports in the SDP offer and the receiver device will include one it wishes to receive in the SDP response. The sender and the receive device may negotiate and renegotiate the control options at the beginning and during the session. FIG. 5 illustrates an example of a signalling flow where the receiver device is a 2D display device requesting 2D video (flattened version of the 360-degree Content) with the recommended viewport from the sender. In FIG. 5, the video source sends an Invite, SDP offer with Session parameters. The Invite message comprises the signal for viewport_ctrl: {device_signalled, device_notsignalled, recommended_viewport, presenter viewport}, and optionally also list of presenters. The device_signalled_xxx may refer to device_signalled_3dof, device_signalled 6dof unconstrained or constrained. The initial Invite message is sent for the receiving devices to join the 360 degree Conference. In the example of FIG. 5, the receiver device is a 2D display device, who responds with the chosen media, which in this example is 2D video stream that follows the recommended viewport. The media is sent over RTP with RTCP reporting without viewport information.

Figure 6:
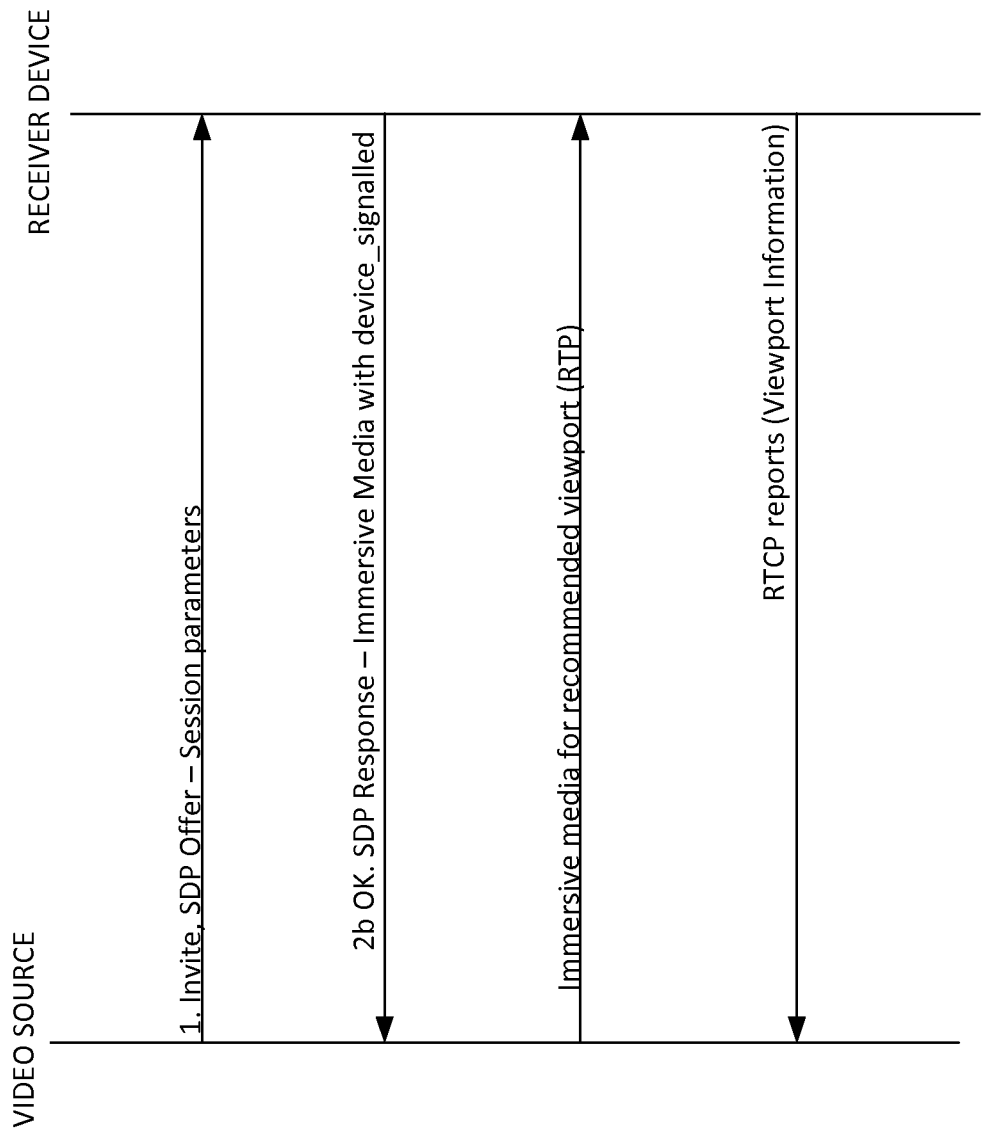
FIG. 6 shows an example of a signaling flow where immersive content is being requested by a receiver device.

FIG. 6 shows the signalling flow when a receiver device equipped with a HMD device requests immersive content with device-controlled viewport. In FIG. 6, the video source sends an Invite, SDP offer with Session parameters. The Invite message comprises the signal for viewport_ctrl: {device_signalled, device_notsignalled, recommended_viewport, presenter viewport}, and optionally also list of presenters. The device_signalled_xxx may refer to device_signalled_3dof, device_signalled_6dof unconstrained or constrained. The initial Invite message is sent for the receiving devices to join the 360 degree Conference. In the example of FIG. 6, the receiver device is a HMD display device, who responds with the chosen media, which in this example is Immersive video stream with viewport control. The media is sent over RTP with RTCP reporting with the viewport information.

If the sender is a streaming server, where the content is delivered via the MPEG DASH protocol, the signaling presented above is not carried via SDP but in the DASH MPD. Instead of SDP or DASH MPD, also other signalling schemes can be used to carry the signalled information via other transport protocol options provided by e.g. RTP/RTSP, RTCP etc.

According to an embodiment, it is possible to dynamically change the control type during the media delivery. This means that instead of the firstly negotiated control type, the receiver device wishes to use another type of a control type. In such embodiment, the signalling of the information occurs via RTP/RTCP, or via MPEG DASH (HTTP).

Figure 7:
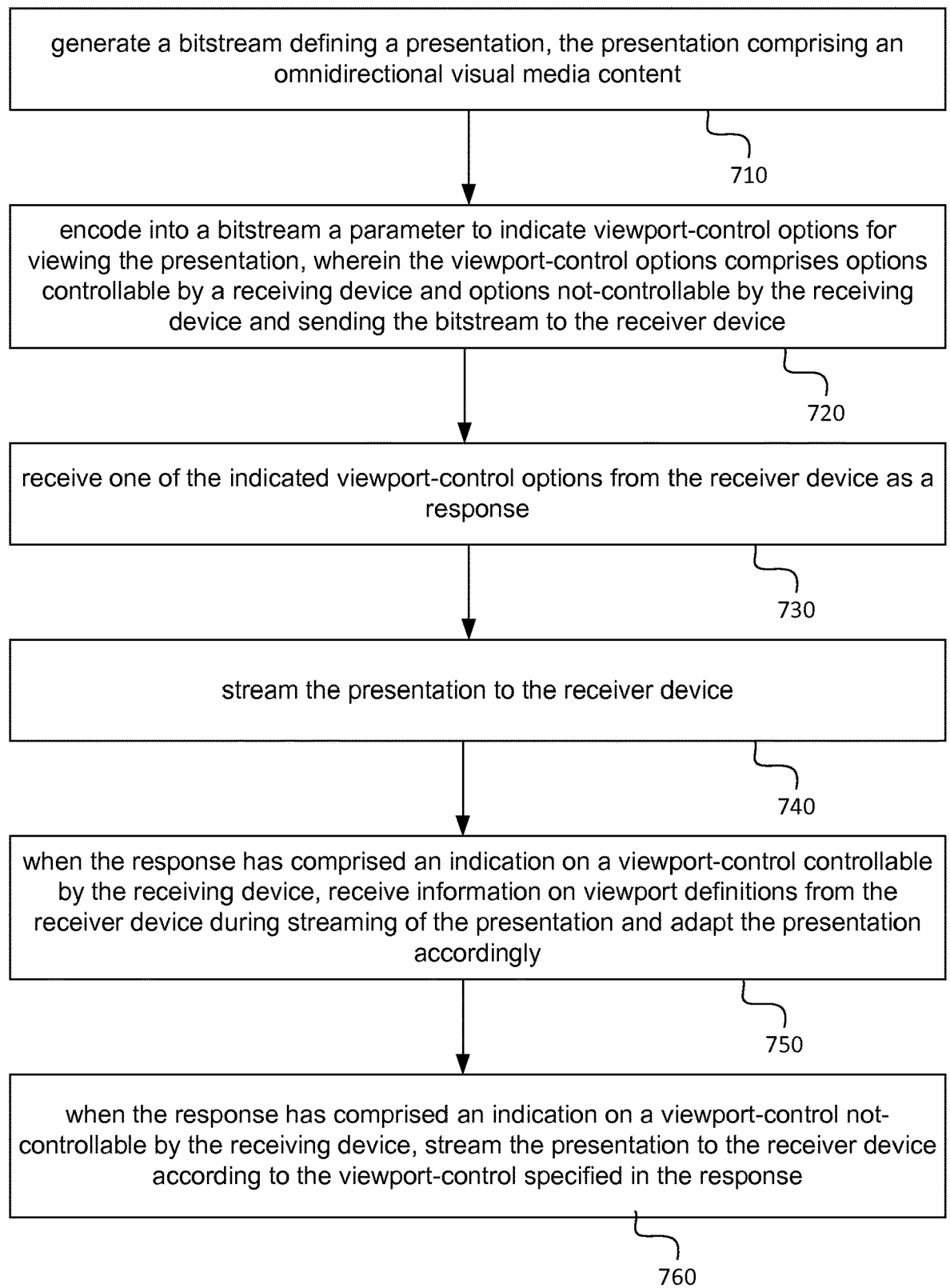
FIG. 7 is a flowchart illustrating a method according to an embodiment.

FIG. 7 is a flowchart illustrating a method according to an embodiment. A method comprises generating 710 a bitstream defining a presentation, the presentation comprising an omnidirectional visual media content; encoding 720 into a bitstream a parameter to indicate viewport-control options for viewing the presentation, wherein the viewport-control options comprises options controllable by a receiving device and options not-controllable by the receiving device and sending the bitstream to the receiver device; receiving 730 one of the indicated viewport-control options from the receiver device as a response; streaming 740 the presentation to the receiver device; when the response has comprised an indication on a viewport-control controllable by the receiving device, the method also comprises receiving 750 information on viewport definitions from the receiver device during streaming of the presentation and adapting the presentation accordingly; when the response has comprised an indication on a viewport-control not-controllable by the receiving device, the presentation is streamed 760 to the receiver device according to the viewport-control specified in the response.

An apparatus according to an embodiment comprises means for generating a bitstream defining a presentation, the presentation comprising an omnidirectional visual media content; means for encoding into a bitstream a parameter to indicate viewport-control options for viewing the presentation, wherein the viewport-control options comprises options controllable by a receiving device and options not-controllable by the receiving device and sending the bitstream to the receiver device; means for receiving one of the indicated viewport-control options from the receiver device as a response;

means for streaming the presentation to the receiver device; when the response has comprised an indication on a viewport-control controllable by the receiving device, the apparatus also comprises means for receiving information on viewport definitions from the receiver device during streaming of the presentation and means for adapting the presentation accordingly; when the response has comprised an indication on a viewport-control not-controllable by the receiving device, the apparatus comprises means for streaming the presentation to the receiver device according to the viewport-control specified in the response. The means comprises at least one processor, and a memory including a computer program code, wherein the processor may further comprise processor circuitry. The memory and the computer program code are configured to, with the at least one processor, cause the apparatus to perform the method of flowchart of FIG. 7 according to various embodiments.

Figure 8:
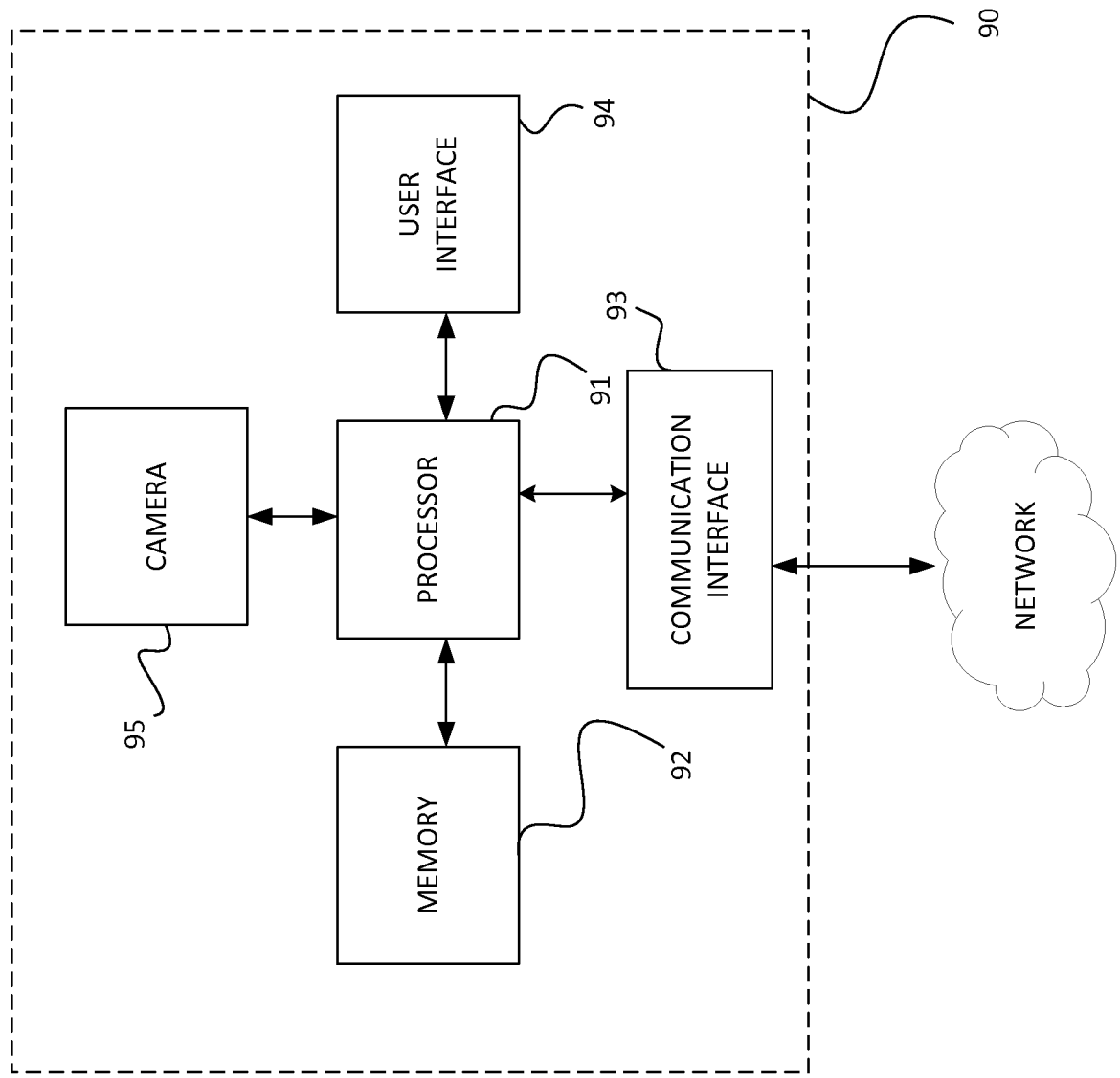
FIG. 8 shows an apparatus according to an embodiment.

An example of an apparatus is shown in FIG. 8. Several functionalities can be carried out with a single physical device, e.g. in a single processor, if desired. The apparatus 90 comprises a main processing unit 91, a memory 92, a user interface 94, a communication interface 93. The apparatus according to an embodiment, shown in FIG. 8, also comprises a camera module 95. The memory 92 stores data including computer program code in the apparatus 90. The computer program code is configured to implement the method according to flowchart of FIG. 6. The camera module 95 receives input data, in the form of video stream, to be processed by the processor 91. The communication interface 93 forwards processed data for example to a display of another device, such a HMD. When the apparatus 90 is a video source comprising the camera module 95, user inputs may be received from the user interface. If the apparatus 90 is a middlebox in a network, the user interface is optional, such as the camera module.

The various embodiments may provide advantages. For example, the embodiments provide a way for a sender/receiver to establish viewport control during a real-time session. The embodiments also provide options specific to 2D display devices (presenter_viewport and recommended_viewport) and generic options (device_signalled and device_notsignalled). When flat 2D media stream is delivered instead of immersive content, the sender can effectively save bandwidth while providing the relevant information to the user. Devices can maintain privacy by choosing to not signal any viewport information. Finally, senders with limited capabilities that cannot provide viewport-dependent streaming can signal this to the receivers.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises generating a bitstream defining a presentation, the presentation comprising an omnidirectional visual media content; encoding into a bitstream a parameter to indicate viewport-control options for viewing the presentation, wherein the viewport-control options comprises options controllable by a receiving device and options not-controllable by the receiving device and sending the bitstream to the receiver device; receiving one of the indicated viewport-control options from the receiver device as a response; streaming the presentation to the receiver device; when the response has comprised an indication on a viewport-control controllable by the receiving device, the method also comprises receiving information on viewport definitions from the receiver device during streaming of the presentation and adapting the presentation accordingly; when the response has comprised an indication on a viewport-control not-controllable by the receiving device, the presentation is streamed to the receiver device according to the viewport-control specified in the response.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:
1. A method, comprising:
delivering an encoded bitstream by providing session-level signaling, comprising:
generating the encoded bitstream defining a presentation, the presentation comprising an omnidirectional visual media content;
including in one or more of session signaling or the encoded bitstream a parameter to indicate viewport-control options for viewing the presentation, wherein the viewport-control options comprise options controllable by a receiving device and options not-controllable by the receiving device, wherein the options not-controllable by the receiving device comprise at least viewport-control options based on a presenter viewport;
sending the encoded bitstream to the receiver device as part of a real-time transport protocol (RTP) session;
receiving, as part of the RTP session, one or a combination of the indicated viewport-control options from the receiver device as a response;
streaming the presentation to the receiver device as part of the RTP session; and
performing, as part of the RTP session, one of the following based on which indication of viewport-control options is provided in the response:
determining the response has comprised an indication on viewport-control options controllable by the receiving device, and performing receiving information on viewport definitions from the receiver device during streaming of the presentation and adapting the presentation accordingly; or
determining the response has comprised an indication on viewport-control options not-controllable by the receiving device, and streaming the presentation to the receiver device according to the viewport-control options specified in the response.

2. The method according to claim 1, wherein the viewport-control options controllable by the receiving device comprises controlling the viewport by the receiving device up to three degrees of freedom, or up to six degrees of freedom in a constrained space or in an unconstrained space.

3. The method according to claim 1, wherein the viewport-control options not-controllable by the receiving device comprises also viewport-control options based on recommended viewport.

4. The method according to claim 1, further comprising receiving the omnidirectional visual media content over a network.

5. The method according to claim 1, further comprising capturing the omnidirectional visual media content.

6. The method according to claim 1, further comprising receiving audio from the receiving device.

7. An apparatus comprising:
at least one processor;
at least one memory storing computer program code that, when executed by the at least one processor, cause the apparatus at least to perform:
delivering an encoded bitstream by providing session-level signaling, comprising:
generating the encoded bitstream defining a presentation, the presentation comprising an omnidirectional visual media content;
including in one or more of session signaling or the encoded bitstream a parameter to indicate viewport-control options for viewing the presentation, wherein the viewport-control options comprise options controllable by a receiving device and options not-controllable by the receiving device, wherein the options not-controllable by the receiving device comprise at least viewport-control options based on a presenter viewport;

sending the encoded bitstream to the receiver device as part of a real-time transport protocol (RTP) session;

receiving, as part of the RTP session, one or a combination of the indicated viewport-control options from the receiver device as a response;

streaming the presentation to the receiver device as part of the RTP session; and performing, as part of the RTP session, one of the following based on which indication of viewport-control options is provided in the response:

determining the response has comprised an indication on viewport-control options controllable by the receiver device, and performing receiving information on viewport definitions from the receiver device during streaming of the presentation and adapt the presentation accordingly; or determining the response has comprised an indication on viewport-control options not-controllable by the receiving device, and streaming the presentation to the receiver device according to the viewport-control options specified in the response.

8. The apparatus according to claim 7, wherein the viewport-control options controllable by the receiving device comprises controlling the viewport by the receiving device up to three degrees of freedom, or up to six degrees of freedom in a constrained space or in an unconstrained space.

9. The apparatus according to claim 7, wherein the viewport-control options not-controllable by the receiving device comprises also viewport-control options based on recommended viewport.

10. The apparatus according to claim 7, wherein the at least one memory further stores computer program code that, when executed by the processor, cause the apparatus at least to perform receiving the omnidirectional visual media content over a network.

11. The apparatus according to claim 7, wherein the at least one memory further stores computer program code that, when executed by the processor, cause the apparatus at least to perform capturing the omnidirectional visual media content.

12. The apparatus according to claim 7, wherein the at least one memory further stores computer program code that, when executed by the processor, cause the apparatus at least to perform receiving audio from the receiving device.

13. A computer program product comprising a non-transitory medium encoded with computer program code configured to, when executed on at least one processor, cause an apparatus or a system at least to perform:

delivering an encoded bitstream by providing session-level signaling, comprising:

generating the encoded bitstream defining a presentation, the presentation comprising an omnidirectional visual media content;

including in one or more of session signaling or the encoded bitstream a parameter to indicate viewport-control options for viewing the presentation, wherein the viewport-control options comprise options controllable by a receiving device and options not-controllable by the receiving device, wherein the options not-controllable by the receiving device comprise at least viewport-control options based on a presenter viewport;

sending the encoded bitstream to the receiver device as part of a real-time transport protocol (RTP) session;

receiving, as part of the RTP session, one or a combination of the indicated viewport-control options from the receiver device as a response;

streaming the presentation to the receiver device as part of the RTP session; and performing, as part of the RTP session, one of the following based on which indication of viewport-control options is provided in the response:

determining the response has comprised an indication on viewport-control options controllable by the receiving device, performing receiving information on viewport definitions from the receiver device during streaming of the presentation and adapt the presentation accordingly; or when the response has comprised an indication on viewport-control options not-controllable by the receiving device, and streaming the presentation to the receiver device according to the viewport-control options specified in the response.

14. The computer program product according to claim 13, wherein the viewport-control options controllable by the receiving device comprises controlling the viewport by the receiving device up to three degrees of freedom, or up to six degrees of freedom in a constrained space or in an unconstrained space.

15. The computer program product according to claim 13, wherein the viewport-control options not-controllable by the receiving device comprises also viewport-control options based on recommended viewport.

16. The computer program product according to claim 13, wherein the computer program code is further configured, upon execution, to perform receiving the omnidirectional visual media content over a network.

17. The computer program product according to claim 13, wherein the computer program code is further configured, upon execution, to perform capturing the omnidirectional visual media content.

18. The computer program product according to claim 13, wherein the computer program code is further configured, upon execution, to perform receiving audio from the receiving device.

* * * * *